United States Patent [19]

Mickelson et al.

[11] Patent Number: 4,866,575

[45] Date of Patent: Sep. 12, 1989

[54] WALL MOUNTED DISTRIBUTING FRAME FOR TELECOMMUNICATIONS CIRCUITS

[75] Inventors: Nils P. Mickelson, Gorham, Me.; Jerauld C. MacFarlane, Hurst, Tex.

[73] Assignee: GTE Products Corporation, Stamford, Conn.

[21] Appl. No.: 191,520

[22] Filed: May 9, 1988

[51] Int. Cl.$^4$ .............................................. H01R 9/00
[52] U.S. Cl. .................... 361/426; 361/428; 379/325; 379/327
[58] Field of Search .............................. 361/425–426, 361/428–429, 417, 419–420; 379/325–328

[56] References Cited

U.S. PATENT DOCUMENTS

| | | | |
|---|---|---|---|
| 2,098,321 | 11/1937 | Treptow | 361/428 |
| 3,518,611 | 6/1970 | Shores, Jr. | 361/428 |
| 3,611,268 | 10/1971 | Wedd | 361/428 |
| 3,711,053 | 1/1973 | Drake | 248/298 |
| 4,002,856 | 1/1977 | Sedlacek et al. | 379/327 |
| 4,117,273 | 9/1978 | Gautier et al. | 379/327 |
| 4,204,095 | 5/1980 | De Luca et al. | 361/428 |
| 4,313,039 | 1/1982 | De Luca et al. | 379/327 |
| 4,497,411 | 2/1985 | Debortoli | 361/429 |
| 4,665,546 | 5/1987 | Brey et al. | 361/428 |
| 4,694,488 | 9/1987 | Mickelson | 379/327 |

Primary Examiner—A. D. Pellinen
Assistant Examiner—Gregory D. Thompson
Attorney, Agent, or Firm—James Theodosopoulos

[57] ABSTRACT

The present invention involves a one-sided modular distributing frame assembly for distributing telephone circuits and particularly adapted for wall mounting. It includes a terminal block bay member which is a generally vertical hollow member with forward and rear surfaces. The forward surface has a plurality of alternating terminal blocks and interstices. Each terminal block communicates with the rear surface and provides appearances for subscriber or office cables. The rear surface is adapted for mounting adjacent a supporting surface. The frame also includes an outside plant bay member which is a generally vertical hollow member with forward and rear surfaces. The forward surface mounts a plurality of connector blocks which provide termination for subscriber cables. The rear surface is adapted for mounting adjacent a supporting surface. The frame also includes a vertical trough member positioned between terminal block bay members and providing a vertical channel for vertical routing of jumper wires between terminal blocks. The grounding circuit may be electrically isolated from the metal of the distributing frame.

13 Claims, 3 Drawing Sheets

WALL MOUNTED DISTRIBUTING FRAME FOR TELECOMMUNICATIONS CIRCUITS

FIELD OF THE INVENTION

The present invention relates to the field of telephony, and more particularly to a new and improved one-sided modular type of distributing frame structure particularly adapted for installation in limited spaces, such as against a wall.

DESCRIPTION OF THE PRIOR ART

Distributing frames are well known in the art and generally are adapted for use in conjunction with equipment found in a telephone distribution center. The distributing frame equipment serves as an interface between the switching equipment (the inside plant or central office equipment) and the cable network of subscriber lines (the outside plant). Most frames feature a skeletonized frame adapted to support various types of connector blocks which provide termination appearances for the cable pairs, together with accompanying blocks for the termination of conductors leading to inside plant equipment. Removable jumper wires are used to interconnect the two, and more or less space utilization is made depending upon effectiveness of frame geometry. Examples of such prior art designs are disclosed in the following U.S. Patents:

| U.S. Pat. No. | 2,098,321 to Treplow: | November 9, 1937 |
|---|---|---|
| U.S. Pat. No. | 3,518,611 to Shores, Jr.: | June 30, 1970 |
| U.S. Pat. No. | 3,611,268 to Webb: | October 5, 1971 |
| U.S. Pat. No. | 3,711,053 to Drake: | January 16, 1971 |
| U.S. Pat. No. | 3,781,758 to Anderson: | December 25, 1971 |

With the constant growth of the number of subscribers, the problem of accommodation of ever-growing connections for a given telephone office requires frames adapted to provide high space utilization with maximum density. In an effort to overcome this burgeoning demand, modular distributing frame assemblies were developed which employed consolidated designs with portions prewired in an effort to optimize use of floor space while reducing installation time. Examples of such prior art design are disclosed in the following U.S. Patents:

| U.S. Pat. No. | 4,002,856 to Sedlacek: | January 11, 1977 |
|---|---|---|
| U.S. Pat. No. | 4,117,273 to Gautier: | September 26, 1978 |
| U.S. Pat. No. | 4,204,095 to DeLuca: | May 20, 1980 |
| U.S. Pat. No. | 4,313,039 to DeLuca: | January 26, 1982 |

An improvement in modular distributing frames is disclosed in U.S. Pat. No. 4,694,488: DISTRIBUTING FRAME FOR TELECOMMUNICATIONS CIRCUITS filed Sept. 15, 1986, U.S. Ser. No. 906,878, and assigned to the Assignee of the present application. Briefly, disclosed therein is a two-sided modular distributing frame wherein the vertical components may be assembled in configurations which serve a variety of installation needs.

While such prior art two-sided frames include many forms of frames adapted to provide high space utilization with maximum connection density, in many installations such devices are inappropriate, for example, because of space limitations or where the building layouts have been designed for a wall-mounted frame. In an effort to meet such limitations imposed by space and building layouts, there was developed in the prior art one sided distributing frames and wall mounted distributing frames. Examples of such prior art designs are disclosed in the following U.S. Patents:

| U.S. Pat. No. | 4,117,273 to Gautier et al: | Sept. 26, 1978 |
|---|---|---|
| U.S. Pat. No. | 4,470,102 to DeLuca et al: | September 4, 1984 |

While the prior art has provided improvements in the areas intended, there is still a great need for one-sided wall mounted distributing frames which are economically adaptable for use in smaller installations while providing the ability to be easily reconfigured to accommodate various wall-mounted installation needs.

Accordingly, an object of the present invention is to provide a new and improved distributing frame for telecommunications circuits which is economically employed in smaller installations.

Another object of the present invention is to provide a modular distributing frame which can be assembled in configurations which serve a variety of installation needs particularly wallmounted installation needs.

A still further object of the present invention is to provide a one-sided distributing frame wherein the grounding circuit may be electrically isolated from the metal of the frame thereby reducing or eliminating the possibility of spurious voltages and currents (such as those known as "ground loops").

SUMMARY OF THE INVENTION

Briefly stated, the invention contemplates the provision of a new and improved one-sided modular distributing frame construction in which the disadvantages of the prior art have been substantially eliminated. The disclosed embodiment is comprised of three main components and ancillary components for completing the desired installation configuration. The components are assembled in sequence to form a frame structure of desired capacity. The basic frame assembly comprises an outside plant (OSP) connector bay which is open on one side to provide for mounting of surge protectors and associated connector blocks connected to outside cables (subscriber lines) the other side of which is adapted to be mounted against a supporting surface; a terminal block bay with openings on one side to provide for mounting of terminal blocks which provide termination appearances for subscriber lines and switching and related office equipment the other side of which is adapted to be mounted against a supporting surface; and a vertical wiring trough member which provides on the front side a channel through which jumper wires pass to interconnect the terminal blocks of the OSP circuits with the corresponding terminal blocks of the central office circuits. A base section provides a horizontal trough at the bottom which provides for jumper wiring runs. The top of the frame is also adapted to provide for wiring runs. By selecting an appropriate sequence of bays and vertical wiring troughs, the distributing frame of the present invention can be uniquely assembled and mounted upon a supporting surface to accommodate a particular installation. Each module of the distributing frame can be arranged so that it can be stacked vertically on top of another similar module so that the capacity of the frame assembly can be increased. With the distributing frame of the present invention, the grounding circuit may be electrically isolated from the metal structure of the distributing frame, thereby eliminating "ground loops".

DESCRIPTION OF THE PREFERRED EMBODIMENTS

Figure 1:
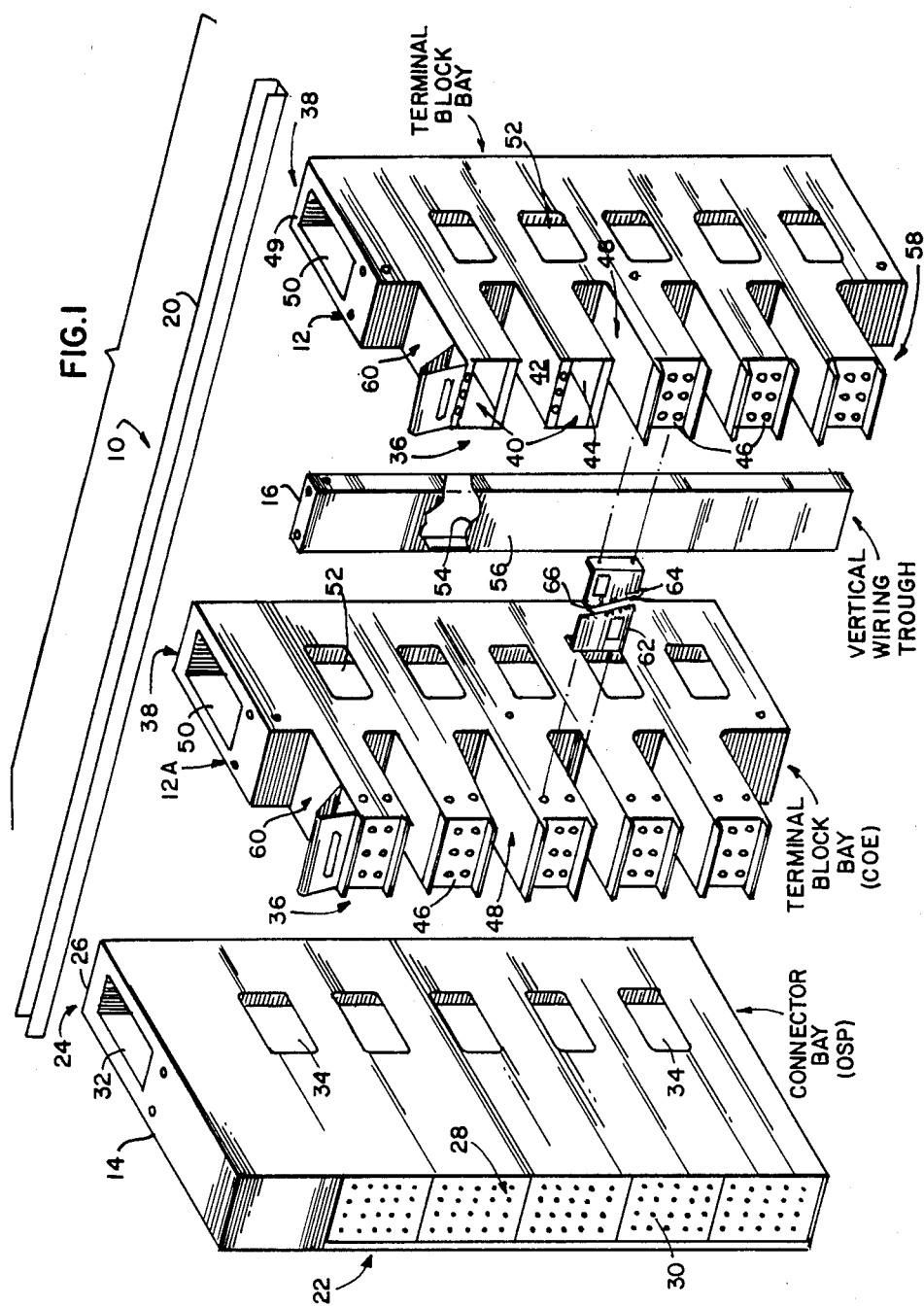
FIG. 1 is an exploded front view of an embodiment of the distributing frame of the present invention.
Figure 2:
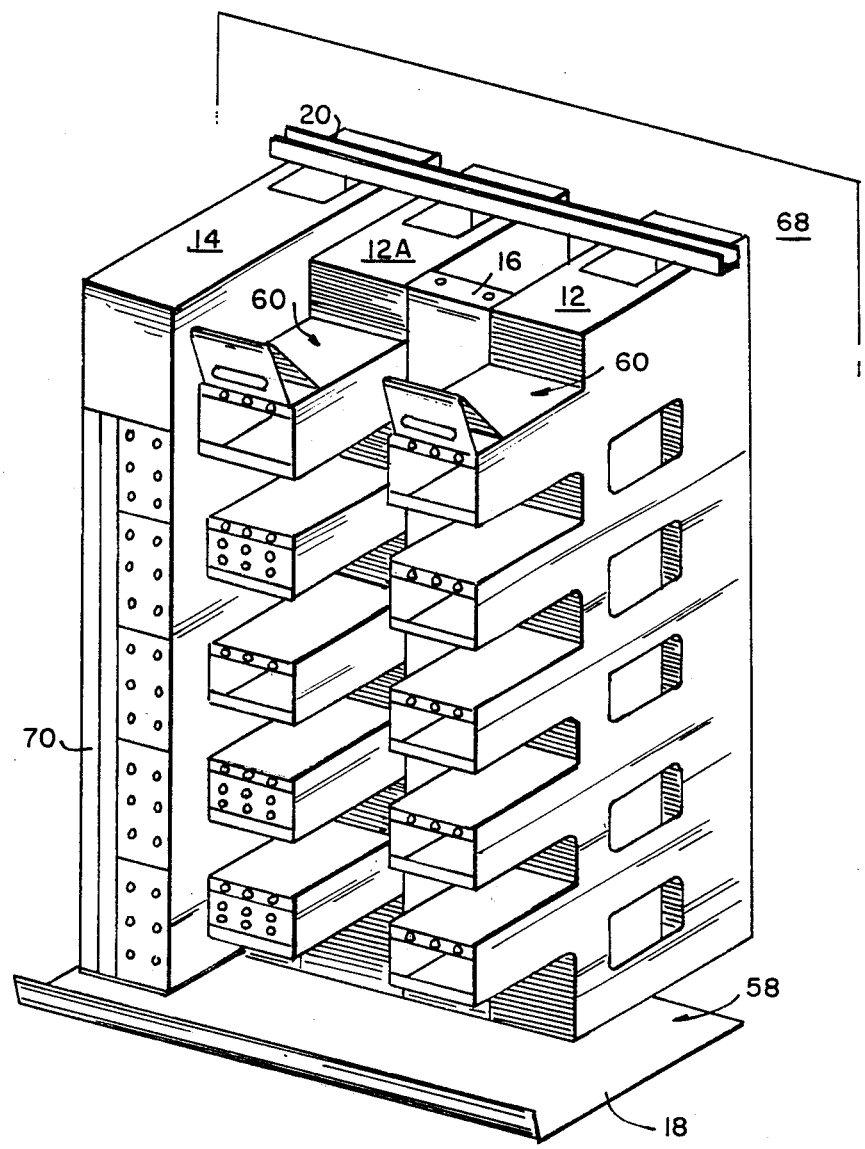
FIG. 2 is a perspective view of the assembled distributing frame of FIG. 1.

Referring now to the drawings and particularly to FIGS. 1 and 2, a module of the distributing frame generally indicated by the reference character 10, comprises terminal block bays 12 and 12a, an outside plant (OSP) bay 14, vertical wiring trough 16, base support member 18 and channel member 20.

In order to maintain clarity of the drawings, the wiring of the distributing frame which is well known to those skilled in the art has been omitted.

The OSP bay 14 interconnects with outside cables, for example, incoming subscriber cables or trunk cables, and includes a front side 22 and a rear side 24. The rear side 24 includes a substantially flat vertical surface member 26, adapted for mounting adjacent a supporting surface such as a wall 68 of FIG. 2. The front side 22 of the OSP bay 14 provides a connector section 28 having a vertical array of apertures. adapted for mounting a plurality of connector blocks 30 constructed and arranged to receive plug-in protector assemblies or modules (not shown) which serve to connect pairs of incoming lines as well as to provide protection against spurious high voltages and current surges that might occur on the incoming lines, all as are well known in the art. Adjacent the rear side 24 of OSP bay 14, there are provided corresponding top and bottom (not shown) apertures 32 which serve as entrances for subscriber cables connected to connector blocks 30. These cables enter the OSP bay vertically through top and bottom apertures 32 and pass through the OSP bay to the connector blocks 30.

The terminal block bays 12 and 12a are constructed in the same manner and provide interconnections with switching and related office equipment, and include a front side 36 and a rear side 38. The front side 36 includes a plurality of apertures forming hollow chamber members 40, each including an upper wall 42 and a lower wall 44, within which individual terminal blocks 46 are mounted. The terminal blocks 46 provide termination appearances for the protected subscriber cables or for switching and related office equipment cables. The walls 42 and 44 define horizontal spaces or interstices 48 which correspond with adjacent interstices 48 and serve to orient and channel jumper wires as discussed later. The rear or reverse side 38 of terminal block bay 12 is provided with a substantially flat vertical surface member 49 adapted for mounting adjacent a supporting surface such as a wall 68 as discussed with respect to surface 26 of OSP bay 14. Adjacent the rear side 38 of terminal block bay 12, there are provided corresponding top and bottom (not shown) apertures 50 which serve as entrances for cables (The switching and office related equipment for example) which pass through the terminal block bay and make their appearances at terminal blocks 46.

A vertical column of side apertures 34 on the OSP bay 14 corresponds to a similar row of apertures 52 on terminal block bays 12 and 12a, providing passageways for cables between the connector blocks 30 and terminal blocks 46. In a typical configuration, any one unprotected subscriber cable enters the OSP bay 14 through aperture 32 and terminates on a connector 30. A corresponding cable originates from each connector 30, is routed through an aperture 34, and terminates on a corresponding terminal block 46. Continuity and protection is effected by inserting connector modules (of types well known in the art) in the connector 30.

The vertical wiring trough 16 is positioned between groups of adjacent terminal block bays (12 and 12a for example) and provides vertical pathways for wiring between the various interstices 48 to terminal blocks 46. For example, a trough or channel is formed between terminal block bay 12, adjacent terminal block bays 12a and the interdisposed surface 54 of side 56 of vertical wiring trough member 16. It can be appreciated that the horizontal space 48 provide a plurality of horizontal channels to orient and channel individual or groups of jumper wires for cross connection. Similarly, the vertical pathway formed by the vertical troughs and adjacent terminal block and/or OSP bays forms vertical channels which also serve to orient and channel wires and cables.

Additionally, the base member 18 is constructed and arranged for attachment to OSP bay 14 so as to provide a horizontal trough or channel 58 (as best seen in FIG. 2) which serves as a pathway for wires exiting the lower edge of the bottom row of terminal blocks 46. Similarly, the spaces 60 at the top of the terminal block bays provide a trough or pathway for wiring runs.

Suitable wire stays 62 and 64 can be attached to adjacent bay members 12 and 12a to contain and control jumper wires which run vertically between interstices 48 and interconnect terminal blocks 46. The diagonal space 66 between stays 62 and 64 permits easy jumper installation.

Referring now to FIG. 2, the distributing frame 10 is shown mounted on a wall surface 68 by mounting means (not shown) well known to those skilled in the art. An end panel 70 may be used to close and cover either end or both ends of the distributing frame assembly by fastening it adjacent to the OSP bay 14 or terminal block bay 12.

Figure 3:
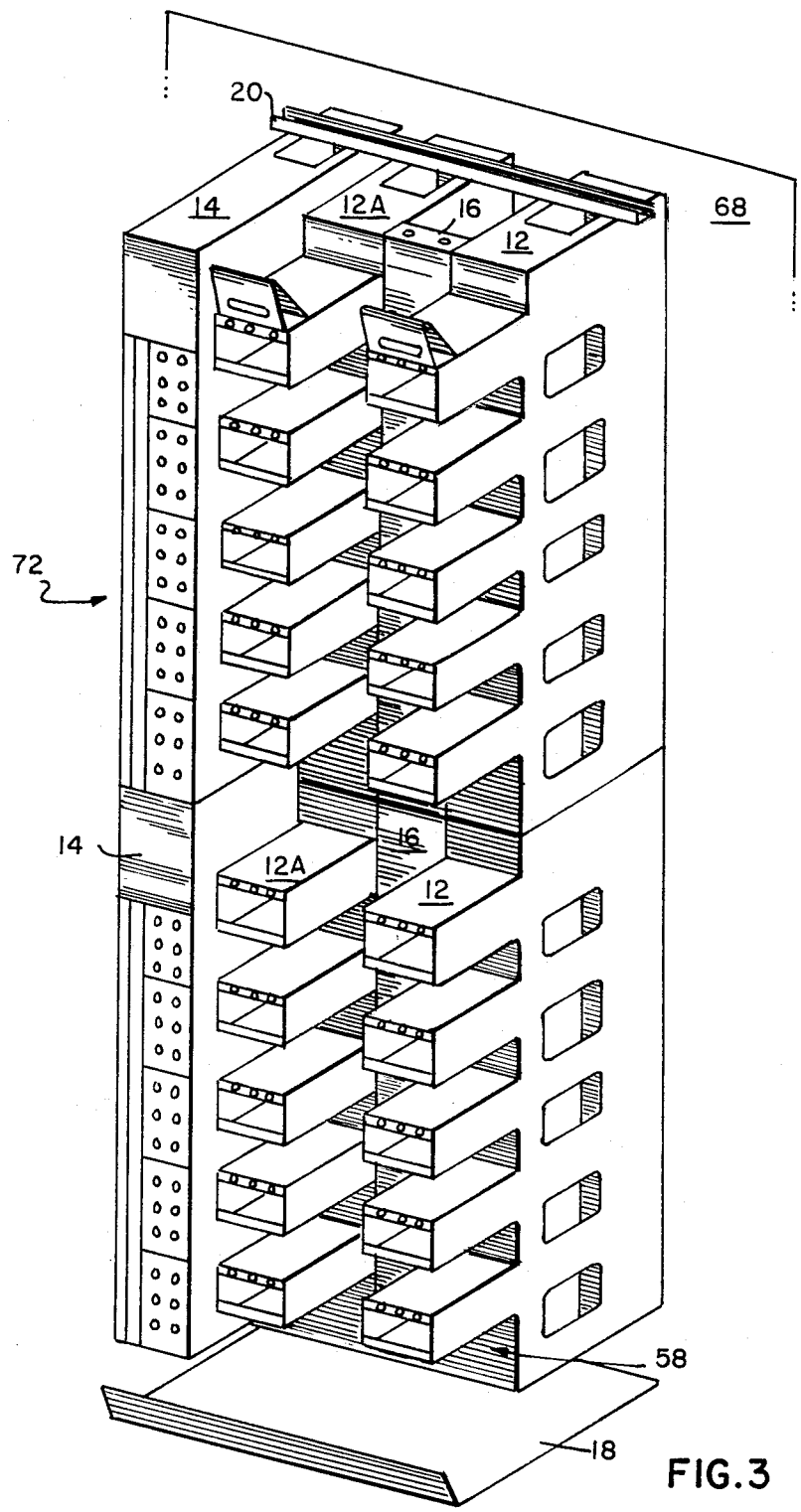
FIG. 3 is a perspective view of an embodiment of the present invention.

Referring now to FIG. 3, there is illustrated generally at 72 a one-sided distributing frame in accordance with the invention wherein the frame 72 comprises two stacked OSP bays 14 and four terminal block bays 12 and 12a, two ends panels 70, and one base member 18.

Since the OSP bays restrict horizontal wiring, they are typically positioned on the left or right ends of the distributing frame assemblies. The arrangement depicted in FIG. 3 thus doubles the capacity of the frame.

It is apparent then that the present invention provides a highly useful improvement in single sided compact module distributing frames which allows full usage of available space by wall mounting or in back to back relationship with similar one sided distributing frames.

Additionally, the present invention provides a novel and highly useful improvement in distributing frame construction, in which owing to the individual design of the OSP and terminal block bays, separated by the vertical troughs, the distributing frame assemblies can be uniquely tailored to any particular installation requirements.

It is apparent to those skilled in the art that changes and modifications may be made within the spirit and scope of the present invention. Accordingly, it is our intention only to be limited by the scope of the appended claims.

As our invention, we claim:

1. A modular distributing frame assembly for distributing telephone circuits, having the assembly module adaptable for assembly adjacent a wall surface, said module comprising:
   an outside plant bay member comprising a generally vertical hollow member having generally forward, rear, top, bottom and side surfaces, said forward surface having a plurality of connector blocks mounted thereon, said rear surface being of flat, vertical uninterrupted configuration adapted for mounting adjacent a supporting surface, and said top, bottom and side surfaces being provided with apertures providing passageways for wiring to said connector blocks;
   at least one terminal block bay member comprising a generally vertical hollow member having generally forward, rear, top, bottom and side surfaces, said forward surface having a plurality of alternating terminal blocks and interstices, said rear surface being of flat, vertical uninterrupted configuration adapted for mounting adjacent a supporting surface, and openings in said terminal block bay member permitting entry of cables for termination appearances at said terminal blocks; and
   a vertical trough member comprising a generally vertical partition member positioned adjacent said terminal block bay member, said vertical trough member providing a vertical channel for conducting selected cables and wires, and said rear surfaces of both said outside plant bay member and said terminal block member being substantially aligned for mounting adjacent a common wall surface.

2. A modular distributing frame assembly for distributing telephone circuits in accordance with claim 1 which further includes another terminal block bay member comprising a generally vertical hollow member having generally forward, rear, top, bottom and side surfaces, said forward surface having a plurality of alternating terminal blocks and interstices, said rear surface being of flat, vertical uninterrupted configuration adapted for mounting adjacent a supporting surface, and openings in said terminal block bay member permitting entry of cables for termination appearances at said terminal blocks, said rear surface of said another terminal block bay member being substantially aligned with that of both said outside plant bay member and said one terminal block bay member.

3. A modular distributing frame assembly as set forth in claim 2 wherein said trough member is positioned between said one terminal block bay member and said another terminal block bay member.

4. A modular distributing frame assembly as set forth in claim 2 wherein said frame assembly comprises a plurality of modules, stacked vertically to increase capacity.

5. A modular distributing frame assembly as set forth in claim 2 wherein said one terminal block bay member and said another terminal block bay member further include a vertical array of apertures positioned on said side surfaces thereof to thereby provide conduits for receiving subscriber cables.

6. A modular distributing frame assembly as set forth in claim 5 wherein said vertical array of apertures on said one terminal block bay member and said array of apertures on said another terminal block bay member are substantially in horizontal alignment.

7. A modular distributing frame assembly as set forth in claim 2 wherein said interstices of said one terminal block bay member and the interstices of said another terminal block bay member are horizontally aligned thereby forming a plurality of horizontal troughs for receiving jumper wires therein.

8. A modular distributing frame assembly for distributing telephone circuits, the assembly having a module adaptable for assembly adjacent a wall surface, said module comprising:
   an outside plant bay member comprising a generally vertical hollow member having generally forward, rear, top, bottom and side surface members, said forward surface member having a vertical array of apertures, each said aperture communicating with said rear surface member and having connector blocks mounted in said apertures to provide appearances for subscriber cables, said rear surface member being of flat, vertical uninterrupted configuration adapted for mounting adjacent a supporting surface, and other apertures in said outside plant bay member permitting subscriber cable entry for termination appearances at said connector blocks;
   a plurality of terminal block bay members each comprising a generally vertical hollow member having generally forward, rear, top, bottom and side surfaces, said forward surface having a vertical array of alternating apertures and interstices, said apertures communicating with said rear surface and having terminal blocks mounted therein to provide appearances for office or subscriber cables, said rear surface being of flat, vertical uninterrupted configuration adapted for mounting adjacent a supporting surface, and other apertures in said terminal block bay member permitting entry of office cables for termination appearances at said terminal blocks; and
   a vertical trough member comprising a generally vertical partition member positioned between adjacent terminal block bay members and having generally forward and rear surfaces, said vertical trough member providing a vertical channel for conducting selected cables and wires, and said rear surfaces of said outside plant bay member and said terminal block bay members being substantially aligned for mounting adjacent a common wall surface.

9. A modular distributing frame assembly as set forth in claim 8 wherein said forward surface of said vertical trough member forms a vertical open channel for receiving jumper wires therein.

10. A modular distributing frame assembly as set forth in claim 9 wherein each said terminal block bay member further includes a vertical array of apertures positioned on said side surface to thereby provide conduits for receiving subscriber cables.

11. A module distributing frame assembly as set forth in claim 10 wherein said vertical array of apertures on each said side surfaces are substantially in horizontal alignment one with the other.

12. A modular distributing frame assembly as set forth in claim 11 further comprising a base member mounted adjacent the bottom of said frame, said base member and adjacent interstices of said terminal block bay members defining a horizontal wiring trough.

13. A modular distributing frame assembly as set forth in claim 8 wherein said frame assembly comprises a plurality of modules stacked vertically to increase capacity.

* * * * *